C. G. OSGOOD.
FILTER.
APPLICATION FILED AUG. 20, 1913.
1,128,495.
Patented Feb. 16, 1915.
3 SHEETS—SHEET 1.
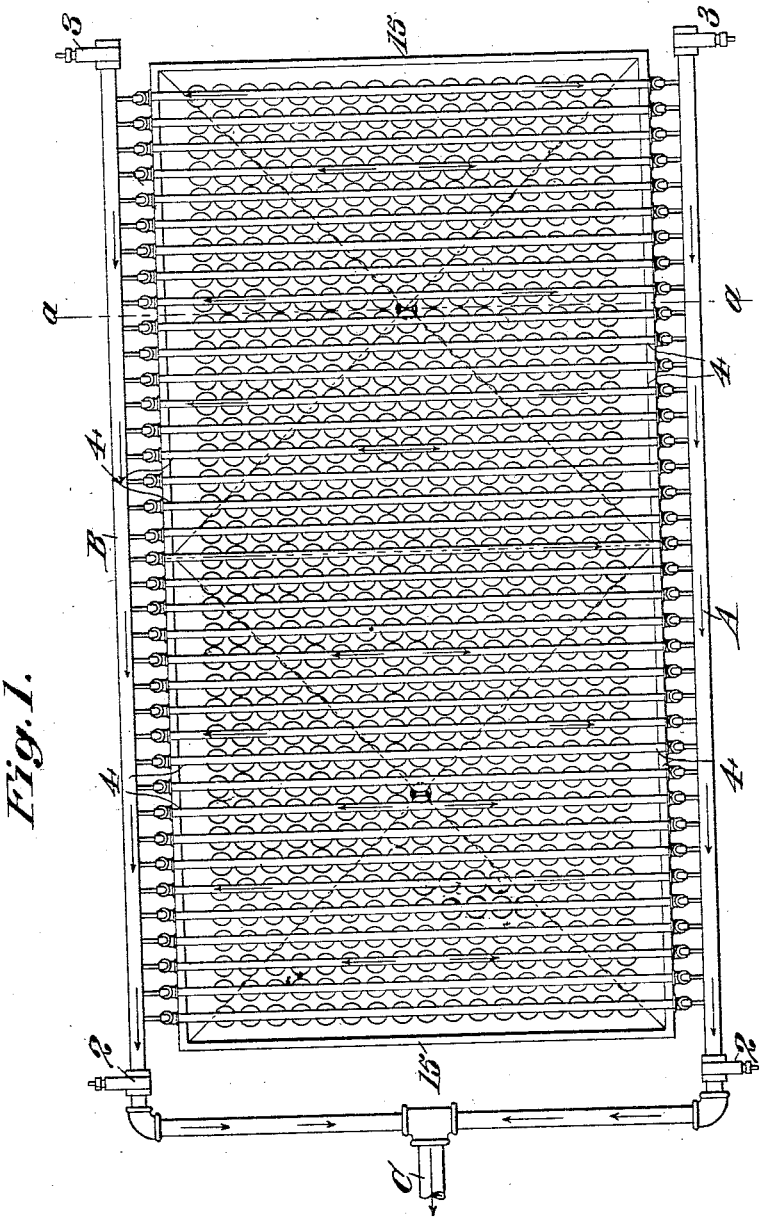
WITNESSES:
INVENTOR
Charles G. Osgood.
BY G. H. Strong.
ATTORNEY

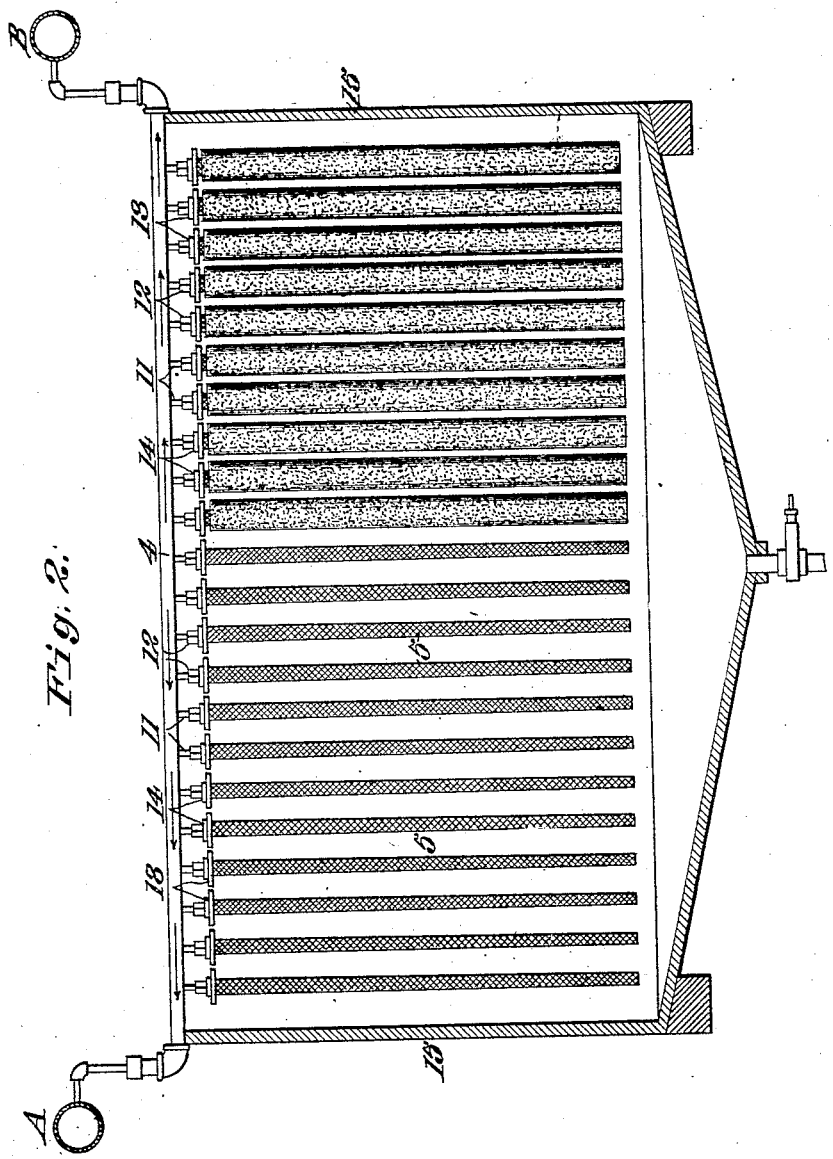

C. G. OSGOOD.
FILTER.
APPLICATION FILED AUG. 20, 1913.
1,128,495.
Patented Feb. 16, 1915.
3 SHEETS—SHEET 3.
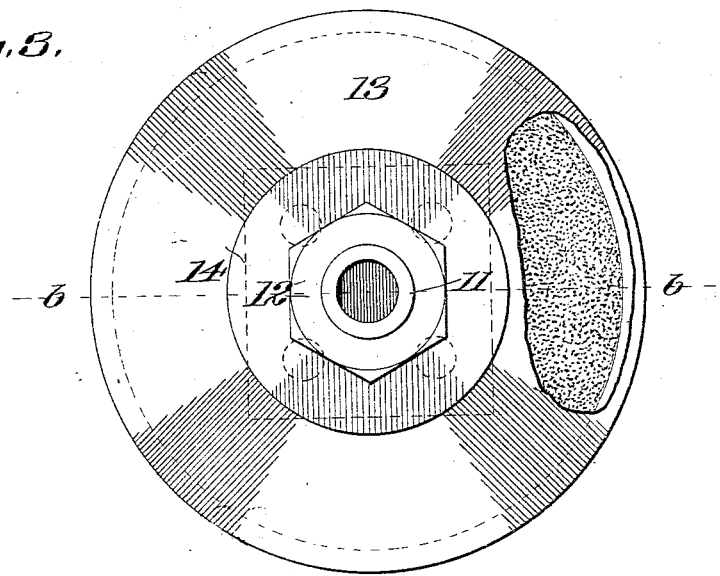
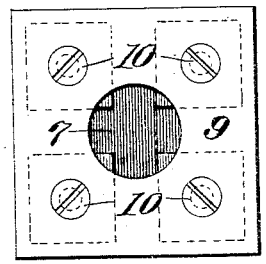
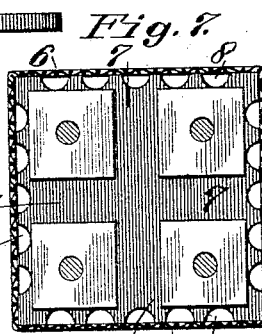
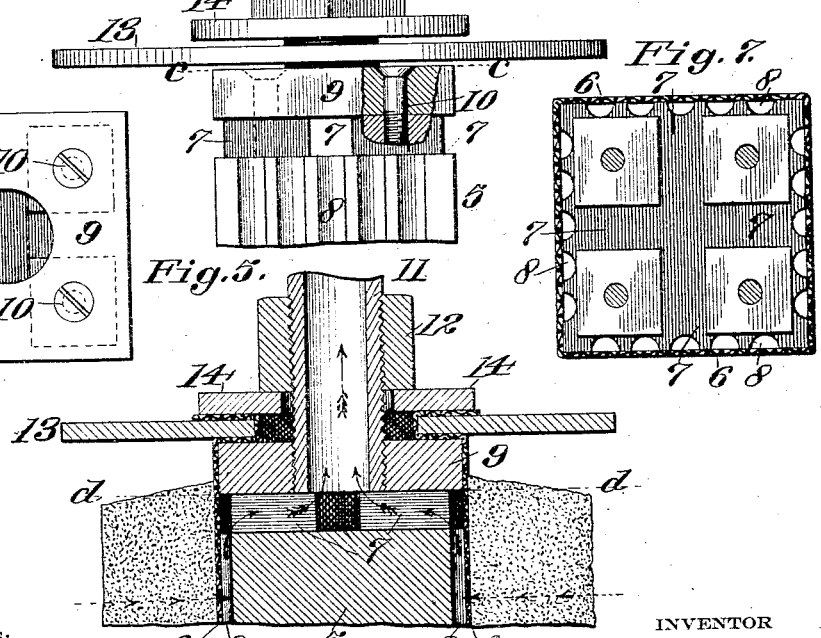
WITNESSES:
Charles Pickles
R. S. Berry
INVENTOR
Charles G. Osgood.
BY G. H. Strong.
ATTORNEY

UNITED STATES PATENT OFFICE.

CHARLES G. OSGOOD, OF TONOPAH, NEVADA, ASSIGNOR OF FIFTY ONE-HUNDREDTHS TO THE MONTANA-TONOPAH MINES CO., OF TONOPAH, NEVADA, A CORPORATION OF DELAWARE.

FILTER.

1,128,495.   Specification of Letters Patent.   Patented Feb. 16, 1915.

Application filed August 20, 1913. Serial No. 785,696.

*To all whom it may concern:*

Be it known that I, CHARLES G. OSGOOD, a citizen of the United States, residing at Tonopah, in the county of Nye and State of Nevada, have invented new and useful Improvements in Filters, of which the following is a specification.

This invention relates to a filter, and particularly pertains to a filter for removing liquids from solutions and forming suspended solids into a porous mass.

It is the object of this invention to provide a method of filtration and an apparatus for accomplishing same by means of which solutions may be effectively separated from solid matter and which is especially adapted for use in filtration of slimes in cyanid operations and for abstracting the thickened pulp from wood pulp solution, filtering sphaltum from gas solutions, and clarifying water and other liquids.

A further object is to provide a filtering apparatus, by means of which the pulp or solid matter held in suspension in a liquid may be separated from the liquid, and formed into hollow cylinders of considerable length with walls of varying thickness and by which the cylinders thus formed can be thoroughly washed of pregnant solutions by cleansing liquid without previous removal of the pulp cylinders from the apparatus.

Another object is to provide a means and method of filtration in which the separated pulp will be so formed and held in mass that moisture can be effectively removed therefrom without causing separation of the particles and fracture of the mass, thus insuring uniform resistance to the passage of liquid therethrough so that the pulp will be thoroughly cleansed throughout during a washing operation.

Another object is to provide means by which the pulp cylinders can be readily removed when the moisture has been extracted therefrom without dismantling any part of the apparatus.

A further object is to provide a method of filtration which is superior to the well-known leaf filter process in thoroughness, capacity per unit of space, economy and convenience of operation, adaptability to various applications, and in which the difficulties encountered by the use of leaf filters, such as unequal building up of the pulp mass on the filter plates, the unpreventable breaking and fracture of pulp mass during operation, and the difficult removal of the pulp mass and cleaning of the filter leaf, is obviated.

Other objects will appear hereinafter.

The invention primarily resides in a series of filter-spikes formed with a tapered core rectangular in cross-section and having longitudinal corrugations on its sides, and a filter fabric inclosing the core; a means for attaching the core with the filter fabric thereon to a manifold suction pipe; and means by which the liquids in a pulp into which the spikes are introduced may be drawn off through the filter-spike and manifold, and a cylinder of the solid substances in the pulp formed on the filter-spike, and which pulp will be discharged from the filter-spike on the breaking of the suction or vacuum.

The invention further consists of the parts and the construction and combination of parts as hereinafter more fully described and claimed, having reference to the accompanying drawings, in which—

Figure 1 is a plan view of the filter apparatus. Fig. 2 is a section and elevation on the line *a—a* of Fig. 1. Fig. 3 is a detail plan view of the upper end of a filter-spike with parts broken away. Fig. 4 is a detail in elevation of the upper end of a filter-spike with the filter-jacket removed and with parts broken away. Fig. 5 is a detail section on the line *b—b* of Fig. 3. Fig. 6 is a detail section on the line *c—c* of Fig. 4. Fig. 7 is a detail section on the line *d—d* of Fig. 5.

In the drawings A and B represent a pair of parallel horizontally extending manifold pipes which are spaced a suitable distance apart and are connected at their inner ends with a pipe C leading to a suction pump (not shown) of any suitable description. Cut-off valves 2 are provided in the manifold pipes A and B adjacent to their inner ends for the purpose of cutting off and controlling the suction in the pipes A and B from the pipe C, and cut-off valves 3 are provided at the outer ends of the pipes A and B for the purpose of opening the pipes to the atmosphere.

Extending laterally between the manifold pipes A and B, mediate the valves 2 and 3, is a series of header pipes 4 which are connected at their ends to the manifold pipes A and B, as particularly shown in Fig. 2;

the interiors of the headers 4 being in direct communication with the interiors of the pipes A and B. Any number of the headers 4 may be employed, as occasion may require.

Mounted on each header 4 is a series of dependent filter spikes each of which consists of a rectangular core 5, covered with a jacket 6 of suitable filter fabric. The core 5 of each filter spike is tapered to converge longitudinally from its upper to its lower ends and is formed with cross channels 7 on its upper end, and vertical grooves or corrugations 8 on its sides. Each spike 5 is connected at its upper end to a horizontal plate 9 conforming in outline to the end of the spike, by means of screws 10, which plate is screwed on a nipple 11 depending from the underside of the header 4. The filter-jacket or sleeve 6 is held in place on the core 5 by means of a nut 12, screwed on the nipple 11; the upper end of the jacket 6 extending over the top of the plate 9, beneath an annular plate 13, thence passing upward over the inner edge of the plate 13, is disposed on the upper face thereof beneath a washer 14 which is caused to bear on the plate 13 to clamp the filter-jacket in place by means of the nut 12 on the nipple 11. The lower end of the nipple 11 extends through the plate 9 so as to form an open communication between the interior of the header 4 and the channels 7 on the upper ends of the spike core 5. The filter spikes on the headers 4 are arranged comparatively close together and are designed to extend downwardly into a tank or vat 15 of any suitable construction, containing the liquid to be filtered, which liquid for the purpose of illustration will be considered as slimes containing a cyanid solution.

In operation, to remove the pregnant solution from the slimes in the vat 15, the filter spikes are submerged in the slimes and a suction or vacuum is induced in the manifold pipes A and B through the pipe C by means of any suitable pump; the valves 2 being open and the valves 3 closed. The suction induced in the manifold pipes A and B will operate through the headers 4 to draw the liquids in the vat 15 through the filter-jackets 6 throughout their length; the liquids passing upward along the corrugations 8, thence through the channels 7, nipples 11, headers 4 and manifolds A and B and pipe C to any suitable point of discharge. The insoluble material in the slimes or pulp in the vat being unable to pass through the filtering medium will collect on the outer faces of the filter-jackets 7 and accumulate thereon in such manner as to form a cylindrical mass extending throughout the length of each filter spike, which mass will gradually increase in thickness and diameter as the liquids are drawn from the vat. The cake formed on each spike has on the outside surface the same diameter at the top and bottom, thus assuming the shape of a cylinder. The inner surface of the cake conforms to the shape of the outside of the spike, which is tapering, having a greater cross section area at the top than at the bottom. The cake consequently varies in thickness over the whole surface of the spike, both horizontally and vertically. On a horizontal section the maximum thickness of cake is always found to be on lines perpendicular to the faces of the spike at the center point of the face; the minimum thickness of cake on diagonals through the corners. Between these points there is a gradual variation from maximum to minimum, etc. As the cross-section of the spike more nearly approaches a circle (by increasing the number of faces on the spike) the more closely the points of maximum and minimum follow one another on the circumference, and consequently more nearly uniform the cake becomes in cross section. On a vertical section the cake varies in thickness by an amount equal to the taper on each face of the spike, irrespective of the cross-section. The cylindrical shape, or circular cross-section, of the cake, adds to its strength and makes it better able to resist external forces, as current eddies due to pumping, etc. That is, it makes it self-supporting, and consequently freer from cracking and dropping during periods in the cycle in which the spikes are not submerged, and the cake is held in place by vacuum and adhesion only. The cake will build up in series of concentric rings, and every point in the same ring will be affected by the force of the internal vacuum to exactly the same degree. In the building of the cake there can be no permanent lines of least resistance. The vacuum will act more strongly, and consequently more rapid cake building will take place along these lines of least resistance, and this will continue until the equilibrium is reëstablished over the whole surface of the cake. When the liquids have been drawn from the vat, the vacuum gradually decreases the amount of moisture held in the cake, and a consequent shrinking and decrease in the outside diameter of the cake results. As the cake shrinks, the outside circumference is decreased in proportion, preserving at all times a uniformly smooth surface free from cracks. When it is desired to wash the pulp mass or cake thus formed on the filter spikes, a wash solution of any description is placed in the vat 15; this solution being drawn through the pulp mass and discharged by the suction pump in the manner employed in removing the pregnant solution. During the washing operation, the force of the internal vacuum acting at the surface of the cake will at every point be exactly the same. Consequently the same amount of wash solution will be drawn through the cake at the points of maximum thickness, as at the points of minimum thickness. The cake along the lines of minimum thickness will receive the maximum washing per unit volume of cake; and the cake along the lines of maximum thickness will receive the minimum washing per unit volume of cake, the cake thus receiving a non-uniform wash. It is to be here noted that the suction acts on the cake to exert a force from its cylindrical surface radially toward its rectangular inner surface, this force tending to render the mass compact and uniform throughout.

When it is desired to remove the pulp mass from the filter spikes the valves 2 are closed to cut off the suction in the manifold pipes A and B and the valves 3 are opened. The opening of the valves 3 causes an inrush of air into the manifold pipes A and B, headers 4 and the passages beneath the filter jackets 6, thus destroying the suction by which the pulp mass was previously supported on the filter spikes. The breaking of the suction will cause the pulp mass or cake to be released, whereupon it will fall by virtue of its own weight into the vat 15 to be afterward removed in any desired manner. The cylindrical shape of the cake is a direct factor in the dropping of the cake by gravitation. The cake being dropped while the spikes are submerged, the pressure of the solution is equal and opposite in direction for any two diametrically opposite points on the surface of the cake. The cake being circular in cross-section and being strong enough to preserve its shape perfectly under such water pressure as exists, resists this external pressure. That is, the water pressure at any point on the surface is balanced by the equal and opposite pressure at the diametrically opposite point. Consequently there is, as long as the cake retains its cylindrical shape, no tendency to press the cake against the filtering medium. Thus the normal or perpendicular pressure tending to press the cake against the filtering medium or, in other words, a force tending directly to increase the adhesion between the cake and the filtering medium, is entirely eliminated by the cylindrical shape of the cake formed on the filter spike. There being no perpendicular pressure transmitted through the cake to the filtering medium there is no static friction. The tapered shape of the spike is also a direct factor, as it eliminates kinetic friction; it being necessary only to overcome the adhesion between the cake and the filtering medium. After being freed from its original position, and after dropping an infinitesimal distance, the decreasing size of the spike allows a free passage of the entire cake, dropping as a whole down the length of the spike. This eliminates entirely the kinetic friction between the cake and the filtering medium. The construction of the spike head facilitates the release and dropping of the cake, as the comparatively large area of the nipple, closely connecting to hollow header, and feeding air to the space between filtering medium and spike, allows for a rapid and complete destruction of the internal vacuum and its resultant force. The dropping plate 13 also facilitates the release of the cake, as in the process of making and dropping the cake the dropping washer, or plate 13 marks a definite point, or surface, above which the cake will not form, furnishes a clean-cut surface to which the cake will not adhere, and consequently reduces the adhesion between the dropping plate 13 and the cake to a minimum, thus necessitating a force of minimum magnitude to effect the separation necessary in dropping the cake. The hollow header construction allows for the rapid distribution of atmospheric pressure to all spikes, and the consequent rapid and complete destruction of internal vacuum and its resultant force throughout the entire series of filter spikes, so that the dropping of all the cakes will be practically simultaneous on the opening of the valves 3. A complete removal of the cake or pulp mass from the filter spike is thus accomplished by atmospheric pressure, the shape of the cake insuring its falling from the filter spike entire, thus leaving no portions to be afterward removed.

By the use of the foregoing described apparatus, the pulp in a vat will be formed into a large number of uniform cylindrical cakes each of which is independent of and separate from the others in the process of formation. This arrangement obviates cracking or fracture of the cake, it being well known that large continuous flat areas of cake are subject to cracking during shrinkage and contraction.

Having thus described my invention, what I claim and desire to secure by Letters Patent, is:

1. In a filtering apparatus, a rectangular tapered core formed with longitudinal grooves on its sides, a jacket of filter fabric inclosing the core and secured thereto, and connections through which liquids may be drawn through the fabric jacket into the grooves and discharged.

2. In a filter, a tubular header, a threaded nipple on the header, a plate screwed on the nipple, a rectangular tapered core attached at one end to said plate, said core formed with longitudinal grooves on its sides and a channel on its end leading to the nipple, a jacket of filter fabric surrounding the core, and means for clamping the jacket to the plate.

3. In a filter, a tubular header, a threaded nipple on the header, a plate screwed on the nipple, a rectangular tapered core attached at one end to said plate, said core formed with longitudinal grooves on its sides and a channel on its end leading to the nipple, a jacket of filter fabric surrounding the core, an annular plate encircling the nipple adjacent to the plate, and a washer and nut on the nipple contiguous to the annular plate, said nut screwed on the nipple and adapted to clamp the end of the jacket in place.

4. In a filter, the combination of a fluid conduit having connections for a vacuum producing means, valves controlling the vacuum in the conduit, a series of headers connected with said conduit, a series of spike cores connected with and supported by the respective headers, said cores each being rectangular in cross section and tapering to its smaller lower end, said cores having longitudinal grooves and channels connecting the grooves with the interior of the headers, a filter jacket surrounding each core, and air valves in said conduit whereby on the first-named valves being closed and said air valves opened the filter spikes automatically discharge the cake.

5. In a filter, the combination of a suspended filter spike having a core which is substantially rectangular in cross section and tapered from its larger upper end to its lower smaller end, said core having peripheral grooves, a filter jacket surrounding the core, vacuum producing connections with said grooves, said spike constructed and arranged to produce a cake of cylindrical shape and of substantially uniform diameter throughout its length, and means whereby on the breaking of the vacuum the cake is automatically discharged from the spike without the application of internal or external fluid pressure, nor movement of nor in any portion of the filter unit or frame, nor the apparatus as a whole.

6. A filtering apparatus including a spike rectangular in cross section and tapered from the upper end toward the smaller, a filtering medium covering the spike, and means for drawing liquid through the spike to cause the solid substances to form in a cylindrical mass on said spike.

In testimony whereof I have hereunto set my hand in the presence of two subscribing witnesses.

CHARLES G. OSGOOD.

Witnesses:
  IRWIN D. McCRAY,
  ROBERT A. GILLERN.